(12) United States Patent
Homa et al.

(10) Patent No.: US 7,257,301 B2
(45) Date of Patent: Aug. 14, 2007

(54) OPTICAL FIBER

(75) Inventors: Daniel Homa, Bloomsbury, NJ (US); John W. Guarniere, Annapolis, MD (US); Paul Zerwekh, Shawsville, VA (US); Brooks Childers, Christiansburg, VA (US); Justin Crusse, Manchester, MD (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/095,804

(22) Filed: Mar. 31, 2005

(65) Prior Publication Data

US 2006/0222306 A1 Oct. 5, 2006

(51) Int. Cl.
*G02B 6/02* (2006.01)
(52) U.S. Cl. ............... 385/123; 385/126; 385/128
(58) Field of Classification Search ........ 385/123–128, 385/96, 100; 65/413
See application file for complete search history.

(56) References Cited

U.S. PATENT DOCUMENTS

| | | | |
|---|---|---|---|
| 4,118,211 A * | 10/1978 | Au Coin et al. ............... | 64/423 |
| 4,165,152 A | 8/1979 | Shiraishi et al. | |
| 5,157,755 A | 10/1992 | Ooe et al. | |
| 5,201,022 A * | 4/1993 | Shifflett ....................... | 385/128 |
| 5,269,825 A | 12/1993 | Sanada et al. | |
| 5,320,659 A | 6/1994 | Ishiguro et al. | |
| 5,327,515 A | 7/1994 | Anderson et al. ............ | 385/123 |
| 5,351,321 A | 9/1994 | Snitzer et al. ................ | 385/10 |
| 5,367,588 A | 11/1994 | Hill et al. ....................... | 385/37 |
| 5,400,422 A | 3/1995 | Askins et al. .................. | 385/37 |
| 6,130,981 A * | 10/2000 | Nelson et al. ................ | 382/128 |
| 6,421,484 B2 * | 7/2002 | Tanaka et al. ............... | 385/100 |
| 6,535,677 B1 * | 3/2003 | Tanaka et al. ............... | 385/123 |
| 6,658,190 B2 * | 12/2003 | Hirano et al. ................ | 385/124 |
| 6,805,497 B1 * | 10/2004 | Ishikawa et al. .............. | 385/96 |
| 6,944,382 B2 * | 9/2005 | Berkey et al. ............... | 385/123 |
| 2004/0234221 A1 * | 11/2004 | Kringlebotn et al. ........ | 385/128 |
| 2006/0140559 A1 * | 6/2006 | Tsuda et al. ................. | 385/123 |

FOREIGN PATENT DOCUMENTS

GB 2156858 10/1985
JP 07133139 5/1995

OTHER PUBLICATIONS

Lemaire, P J; Walker, K L; Kranz, K S; Huff R G and Dimarcello F V, Diffusion of Hydrogen Through Hermetic Carbon Films on Silica Fibers, Materials Research Society Symposium Proceedings, 1990, pp. 85-95, vol. 172, Materials Research Society, Pennsylvania.

(Continued)

*Primary Examiner*—Quyen Leung
(74) *Attorney, Agent, or Firm*—The H.T. Than Law Group

(57) ABSTRACT

An optical fiber resistant to hydrogen-induced attenuation losses at both relatively low and relatively high temperatures includes a substantially pure silica core and a hydrogen retarding layer. The hydrogen retarding coating may be made of carbon, metal, or silicon nitride. The fiber may also include a cladding layer, a second silica layer, and a protective outer sheath.

13 Claims, 2 Drawing Sheets

OTHER PUBLICATIONS

Lemaire, P J, Reliability of Optical Fibers Exposed to Hydrogen: Prediction of Long Term Loss Increases, Optical Engineering, 1991, pp. 780-789, vol. 30(6), AT&T Bell Laboratories, New Jersey.

Patent Abstracts of Japan, vol. 1995, No. 08, Sep. 29, 1995.
International Search Report and Written Opinion for PCT/US2006/011939, dated Aug. 22, 2006. Authorized Officer: K. Kervinen.

* cited by examiner

OPTICAL FIBER

BACKGROUND

The invention relates generally to optical fiber technologies. In particular, the invention relates to optical fibers that resist attenuation losses at high temperatures.

Available electronic sensors measure a variety of values, such as, pH, color, temperature, or pressure, to name a few. For systems that require a string of electronic sensors over a long distance, e.g., twenty to thirty kilometers or longer, powering the electronic sensors becomes difficult. Conventionally, the powering of electronic sensors requires running electrical wire from a power source to each of the electronic sensors. Powering electronic sensors electrically has been unreliable in the petroleum and gas industry. For example, electric wires spanning long distances are subject to a significant amount of interference and noise, thereby reducing the accuracy of the electronic sensors.

Optical fibers have become the communication medium of choice for long distance communication due to their excellent light transmission characteristics over long distances and the ease of fabrication of lengths of many kilometers. Further, the light being transmitted can interrogate the sensors, thus obviating the need for lengthy electrical wires. This is particularly important in the petroleum and gas industry, where strings of electronic sensors are used in wells to monitor downhole conditions.

As a result, in the petroleum and gas industry, passive fiber optic sensors are used to obtain various downhole measurements, such as, pressure or temperature. A string of optical fibers within a fiber optic system is used to communicate information from wells being drilled, as well as from completed wells. The optical fiber could be deployed with single point pressure-temperature fiber optic sensor. Also, a series of weakly reflecting fiber Bragg gratings (FBGs) may be written into a length of optical fiber or a single point Fabry-Perot sensor may be spliced into a length of optical fiber. An optical signal is transmitted down the fiber, which is reflected and/or scattered back to a receiver and analyzed to characterize external parameters along the length of the optical fiber. Using this information, downhole measurements including but not limited to temperature, pressure, and chemical environment may be obtained.

However, when conventional optical fibers such as germanium-doped silica fibers are exposed to the intense heat, pressure, and chemical-rich environment of an oil well attenuation losses increase. This increase in the loss of optical strength of the signal is due, in part, to the diffusion of hydrogen into the glass structure. Hydrogen atoms bond to any open or weak bonds in the glass structure, such as to certain germanium atoms in the vicinity of germanium-oxygen deficient centers or to form SiOH and/or GeOH. For germanium doped fibers, the attenuation increases rapidly with increases in temperature. As temperatures in a typical oil or gas well generally range from slightly less than surface temperature near the surface to between about 90 to 250 degrees Centigrade (C.), conventional germanium-doped optical fibers are generally not sufficiently stable for prolonged use at depth in a well. While coating germanium-doped silica fibers with carbon or similar molecularly dense materials is an effective way to reduce hydrogen diffusion into the glass at lower temperatures, such as below 120 degrees C., the effectiveness of the carbon coating diminishes rapidly as the ambient temperature increases.

It is known that fiber cores having alternate glass structures can be more stable when exposed to the type of environment encountered in a well. For example, pure silica glass core fibers are particularly suitable for use in oil wells as the pure silica is resistant to hydrogen incursion at high temperatures. However, at lower temperatures, such as the temperature in the upper portion of a well, attenuation losses from molecular hydrogen can be relatively large.

Therefore, a need exists for optical fiber that is resistant to hydrogen incursion and the correlated induced attenuation losses over a wider range of temperatures.

SUMMARY OF THE INVENTION

An aspect of the invention is directed toward an optical fiber with a substantially pure silica core. The fiber also includes a layer of hydrogen-resistant material.

Another aspect of the invention is directed toward an optical fiber including means for reducing hydrogen-induced attenuation at both relatively low and relatively high temperatures.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
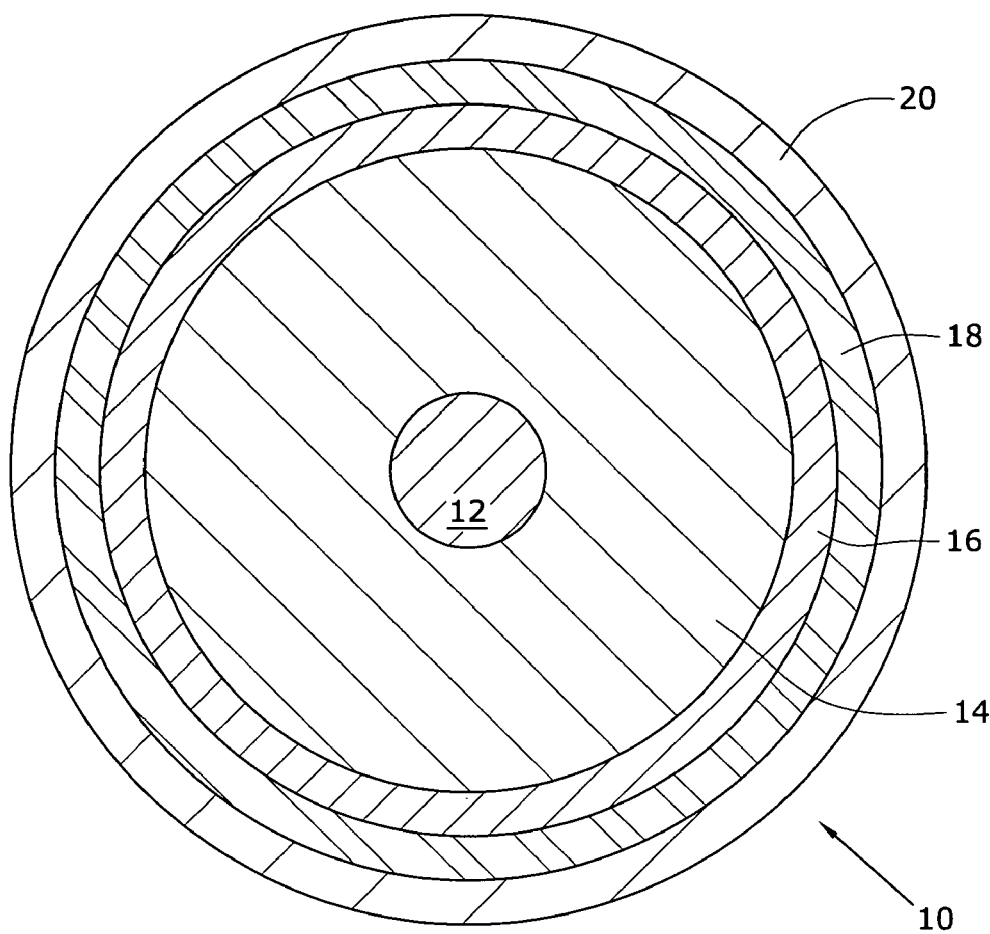
FIG. 1 is a schematic cross-sectional drawing of an optical fiber according to the present invention.

As illustrated in the accompanying drawings and discussed in detail below, the present invention is directed to an optical fiber. As shown in FIG. 1, optical fiber 10 generally includes a substantially pure silica glass core 12, and a concentric doped silica glass cladding layer 14. Core 12 may be any substantially pure silica core known in the art. In one embodiment, core 12 may be a "defect free" pure silica core, while in another embodiment a substantially pure silica core is doped with a very low concentration of dopant, such as germanium or fluorine. For example, core 12 may include a low concentration of fluorine at or near the outer diameter of core 12. Core 12 may have diameter known in the art, preferably about 0.1-12 microns, depending on factors including the desired single mode cutoff wavelength.

Cladding layer 14 may be any cladding layer known in the art appropriate for use with substantially pure silica cores. In order to keep light signals contained within core 12 for a single mode fiber, the index of refraction of cladding layer 14 is significantly different from that of core 12 due to differences in the material composition of the glass in the different parts of fiber 10. For example, to depress the index of refraction in cladding layer 14, the silica glass is doped with fluorine, boron or similar materials. In order to increase the index of refraction in cladding layer 14, germanium, phosphorous or a similar material as known in the art is used to dope the silica. Cladding layer 14 may be any thickness known in the art, preferably ranging from about a few microns to about one thousand microns. A second layer 16 of silica glass is optionally included in fiber 10, and a hydrogen retarding layer 18 is concentrically disposed around optional silica layer 16. A sheath or secondary coating 20 preferably encases fiber 10.

As is known in the art, molecular hydrogen-induced losses (attenuation) in "defect free" pure silica core fiber is due to the vibration of the hydrogen gas molecules when dissolved in silica glass, while in germanium doped fibers, the reaction of the hydrogen with the glass network results in additional "irreversible" losses due to Ge/Si—OH absorption peaks ($\Delta\alpha_{OH}$) and due to short wavelength edges losses ($\Delta\alpha_{SWE}$). Thus, the total hydrogen-induced losses ($\Delta\alpha_{H2-T}$) in most commercially available fibers can be easily defined as $\Delta\alpha_{H2-T}=\Delta\alpha_{H2}+\Delta\alpha_{SWE}+\Delta\alpha_{OH}$, where $\Delta\alpha_{H2}$ is due to molecular hydrogen.

The hydrogen-induced reactions, SWE & OH, in germanium doped fibers are dependent on time and the losses in typical germanium doped fibers can be estimated by the method discussed in Paul J. Lemaire, *Reliability of Optical Fibers Exposed to Hydrogen: Prediction of Long Term Loss Increases*, 30(6) OPTICAL ENGINEERING 780 (1991).

$$\Delta\alpha_{SWE}=(3.09)(10^8)(T)(\Delta t)\exp[-98.94 \text{ kJ/mol}/(R)(T)] \text{ dB/km·h·K} \quad \text{Eq. 1}$$

$$\Delta\alpha_{OH}=(4.80)(10^5)(T)(\Delta t)\exp[-97.94 \text{ kJ/mol}/(R)(T)] \text{ dB/km·h·K} \quad \text{Eq. 2}$$

where T is temperature, $\Delta t$ is time, and R is the gas constant (all equations herein utilize Kelvin for temperature, atmospheres for pressure, and standard kg-km SI units for all other parameters). Thus, the $H_2$ induced losses due to each mechanism can be estimated at a particular temperature if the time is specified, such as the expected deployment time or anticipated useful life of the fiber. Thus, these terms can be more easily defined as $\Delta\alpha_{SWE}$ and $\Delta\alpha_{OH}$ at a particular time and temperature.

The magnitude of molecular hydrogen-induced losses is directly proportional to the concentration of hydrogen in core 12. The solubility ($S_{H2}$) is defined as $$S_{H2}=S_0 \exp(-E_s/\kappa T) \quad \text{Eq. 3}$$

where $S_0$ is the solubility constant of the solution, $E_s$ is the enthalpy of the solution, T is temperature, and $\kappa$ is Boltzmann's constant. Thus, it can be seen that the hydrogen gas solubility of substantially pure silica glass decreases as temperatures increase. Furthermore, the equilibrium $H_2$ absorption has been expressed in Lemaire 1991 as $$\Delta\alpha_{H2}=A(\lambda)P_{H2} \exp(8.67 \text{ kJ/mol}/RT) \quad \text{Eq. 4}$$

where $A(\lambda)$ reflects the spectral dependence of molecular hydrogen losses, $P_{H2}$ is the partial pressure of hydrogen, R is the gas constant, and T is temperature.

Thus, the induced attenuation due to molecular hydrogen decreases with temperature. The sole mechanism that accounts for hydrogen-induced loss in "un-reactive" pure silica core fibers is molecular hydrogen, while in germanium doped fibers, the hydrogen reacts with the glass network to induce additional loss mechanisms.

Figure 2:
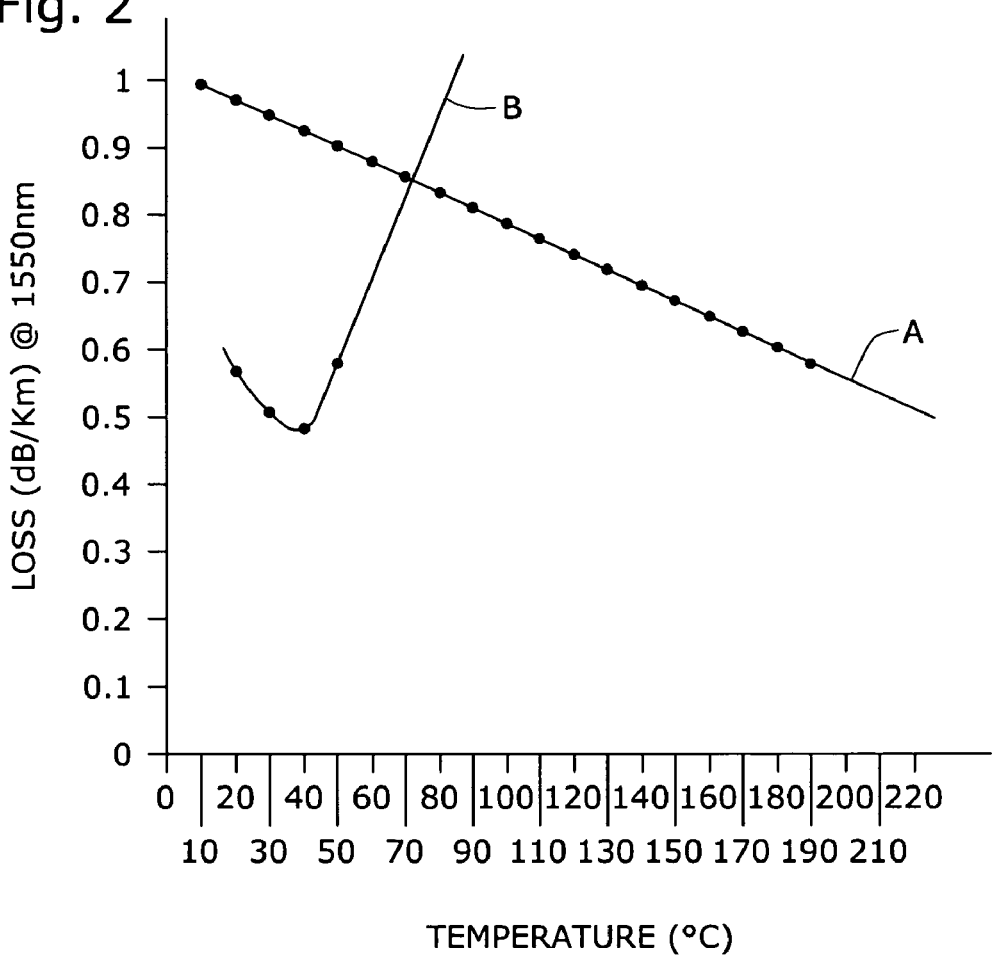
FIG. 2 is a graph showing hydrogen-induced attenuation versus temperature for a pure silica core fiber and a germanium doped silica core fiber.

FIG. 2 shows two curves, A and B, presenting data developed using these Lemaire 1991 equations. Curve A reflects the anticipated induced attenuation at 1.55 microns, $\Delta\alpha_{H2-T}=\Delta\alpha_{H2}$, of a pure silica core fiber due to molecular hydrogen for a year-long exposure to hydrogen gas at partial pressure of 1 atm (14.7 psi), while curve B, $\Delta\alpha_{H2-T}=\Delta\alpha_{H2}+\Delta\alpha_{SWE}+\Delta\alpha_{OH}$, reflects the measured hydrogen-induced losses for a germanium doped silica core fiber at 1.55 microns under the same conditions. In order to better fit test data, curve A was developed using a modified version of Eq. 4 as shown by the following:

$$\Delta\alpha_{H2}=[A(\lambda)P_{H2}(8.67 \text{ kJ/mol}/RT)]^{0.85} \quad \text{Eq. 5}$$

where $A(\lambda)$ is the spectral dependence of the loss increase (0.279 dB/km·atm$^{-1}$).

Curve B was developed using the Lemaire 1991 equations without alteration. Curves A and B clearly show that including pure or substantially pure silica glass core 12 in fiber 10 reduces hydrogen-induced attenuation losses compared with doped silica cores, particularly at higher temperatures, such as those found at productive depths in oil and gas wells. The performance of the germanium doped fibers and undoped fibers is relatively the same at temperatures below 100 C because below that temperature the $H_2$ does not extensively react with the fiber. Furthermore, it can be seen that the losses due to molecular hydrogen actually decrease with increasing temperature so that at higher temperatures, the molecular hydrogen-induced losses are actually lower than at low temperatures. This low-temperature susceptibility of pure or substantially pure silica cores such as core 12 is minimized in this embodiment by including hydrogen retarding layer 18.

Hydrogen retarding layer 18 is preferably a layer of hydrogen-resistant material formed on the exterior surface of optional second silica layer 16, although hydrogen retarding layer 18 may also be formed on an interior surface of optional second silica layer 16. The hydrogen-resistant material may be any material known in the art that shields or slows the diffusion of hydrogen gas therethrough, preferably at temperatures up to 150 degrees C. Such hydrogen-resistant materials include, but are not limited to, carbon, metals such as copper, aluminum, gold and their alloys, and ceramics such as covalently bonded ceramic materials such as silicon nitride and silicon carbide. The dense molecular structure of hydrogen-resistant materials used to form hydrogen retarding layer 18 slows the diffusion of hydrogen gas into the glass layers 12, 14, 16 of optical fiber 10 at lower temperatures. These effects are greatest at lower temperatures such as those temperatures encountered near the surface of an oil or gas well or in lower temperature wells, preferably less than about 150 degrees C., more preferably less than about 130 degrees C., and most preferably at temperatures less than about 120 degrees C. It has been discovered that hydrogen retarding layer on a germanium doped silica core fiber tends to lose its resistance to hydrogen, often incurring hydrogen-induced losses greater than 3 dB/km at temperatures above 200 degrees C. at 1 atm, in a relatively short period of time, such as a few days or weeks depending on the coating material. In comparison, the hydrogen-induced losses at 1 atm in substantially pure silica core fibers without a hydrogen retarding layer such as hydrogen retarding layer 18 have been shown to be below 0.3 dB/km at temperatures above 200 degrees C. A similar effect at elevated temperatures is anticipated for all of the hydrogen-resistant materials discussed herein. As will be apparent to those in the art, these temperatures and temperature ranges depend upon the duration of exposure of optical fiber 10 to the hydrogen gas. For example, for shorter exposures of optical fiber 10 to hydrogen gas, higher temperatures may be tolerated. Similarly, for longer exposures of optical fiber 10 to hydrogen gas, lower temperatures are tolerated.

With both hydrogen retarding layer 18 and substantially pure core 12, fiber 10 of the present invention has improved hydrogen resistance, or lower hydrogen solubility, at both relatively high and relatively low temperatures as compared to conventional fibers such as carbon coated germanium doped core fibers or pure silica core fibers without a coating or layer of hydrogen resistant material. Hydrogen retarding layer 18 noticeably decreases the amount of hydrogen that diffuses to core 12 of fiber 10 at low temperatures where pure silica core would be very hydrogen soluble. Similarly, substantially pure silica core 12 decreases the equilibrium $H_2$ absorption at higher temperatures where the effects of hydrogen retarding layer 18 are diminished.

Figure 3:
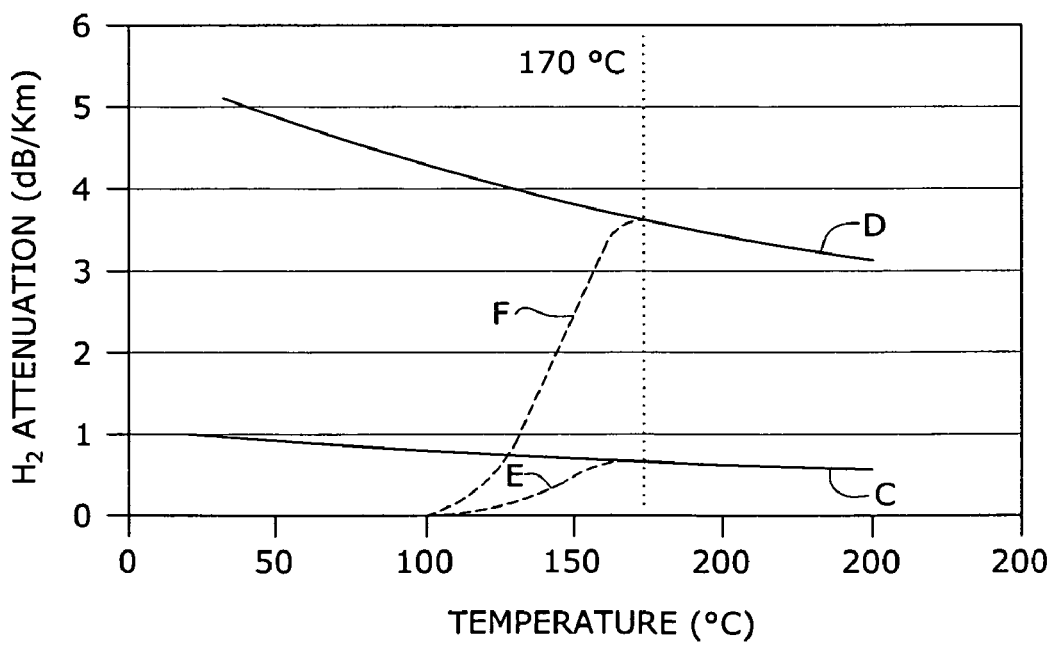
FIG. 3 is a graph showing the anticipated attenuation losses of an embodiment of optical fiber according to the present invention versus attenuation losses in a conventional fiber.

FIG. 3 shows anticipated performance of an inventive fiber 10 and the measured performance of the same fiber without hydrogen retarding layer 18. Similar to curve A shown above, all curves in FIG. 3 were developed using Eq. 5. Solid curve C shows the hydrogen-induced attenuation losses of an uncoated fiber at $H_2$ partial pressure of 1 atm (14.7 psi), and solid curve D shows the hydrogen-induced attenuation losses of the fiber without a hydrogen retarding layer at $H_2$ partial pressure of 6.8 atm (100 psi). Dashed-line curve E shows the anticipated hydrogen-induced attenuation losses of inventive fiber 10 at $H_2$ partial pressure of 1 atm, and dashed-line curve F shows the anticipated hydrogen-induced attenuation losses of fiber 10 at $H_2$ partial pressure of 6.8 atm.

The induced losses, shown in curves E and F, in carbon coated pure silica core fiber were estimated using equations discussed in Paul J. Lemaire, et al., *Diffusion of Hydrogen Through Hermetic Carbon Films on Silica Fibers*, 172 MAT. RES. SOC. SYMP. PROC. (1990).:

$$\Delta\alpha_{C-H2}(t) = [1-\exp\{-(t-\tau_i)/\tau_f\}] \cdot \Delta\alpha_{H2} \qquad \text{Eq. 6}$$

where t is time, $\tau_i$ is the lag time, $\tau_f$ is the time to equilibrium, $\Delta\alpha_{H2}$ is the saturated induced attenuation due to molecular hydrogen. $\tau_i$ and $\tau_f$ are described by the following:

$$\tau = A_c \cdot \exp(E_A/RT) \qquad \text{Eq. 7}$$

where $A_c$ is constant, $E_A$ is the activation energy, R is the gas constant and T is temperature. Furthermore, Eq. 5 can be simplified as the time approaches $\tau_f$ for reasonable lifetimes of a fiber optic cable with a pure silica core fiber deployed in an oil or gas well, such as for about 5 years, to the following:

$$\Delta\alpha_{C-H2}(t) = (t/\tau_f) \cdot \Delta\alpha_{H2} \qquad \text{Eq. 8}$$

By substituting Eq. 6 for $\tau_f$, the hydrogen-induced loss in the fiber having a hydrogen retarding layer becomes:

$$\Delta\alpha_{C-H2}(t) = \{t/[A_c \cdot \exp(E_A/RT)]\} \cdot \Delta\alpha_{H2} \qquad \text{Eq. 9}$$

Finally, by substituting Eq. 5 for $\Delta\alpha_{H2}$, Eq. 8 can be expressed as follows:

$$\Delta\alpha_{C-H2}(t) = \{t/[A_c \cdot \exp(E_A/RT)]\} \cdot [A(\lambda)P_{H2}(8.67 \text{ kJ/mol}/RT)]^{0.85} \qquad \text{Eq. 10}$$

Thus, the induced losses at any temperature can be readily calculated when time is held constant.

As is clearly shown by curves E and F, when the time frame is 5 years, hydrogen retarding layer 18, in this case assumed to be carbon, prevents nearly all of the hydrogen-induced losses up to approximately 100 degrees C. Between 100 degrees and 170 degrees C., curves E and F reflect the rapid deterioration of hydrogen retarding layer 18 and a correlated spike in hydrogen-induced losses. At about 170 degrees C., the performance of silica core 12 begins to dominate the performance of fiber 10, and curves E and F show that the hydrogen-induced losses to begin to level off. At higher temperatures, all curves C-F follow the same path, showing that both the fiber lacking hydrogen retarding layer 18 and inventive fiber 10 have the same or similar hydrogen-induced losses. At these temperatures the hydrogen resistance of substantially pure silica core 12 controls and the hydrogen-induced losses in the fibers slowly decline as the temperature rises.

Sheath or secondary coating 20 is preferably any commercially available coating, including but not limited to acrylate, polyimide, polyamide, silicone, and Teflon® and other fluoropolymers. Secondary coating 20 helps protect fiber 10 from exposure to environmental conditions, such as chemicals, and moisture, and improve handling by protecting fiber 10 from mechanical stresses. Secondary coating 20 may be any thickness appropriate for the material and the intended use. For the purposes of example only, if secondary coating is polyimide or polyamide, typical thicknesses range from about 5 to about 15 microns, while the thickness may be 100 microns or greater if acrylate, silicone, or fluoropolymers are used. Additionally, secondary coating 20 may include multiple layers of materials. For example, a soft layer and a harder outer layer may be included.

Figure 4:
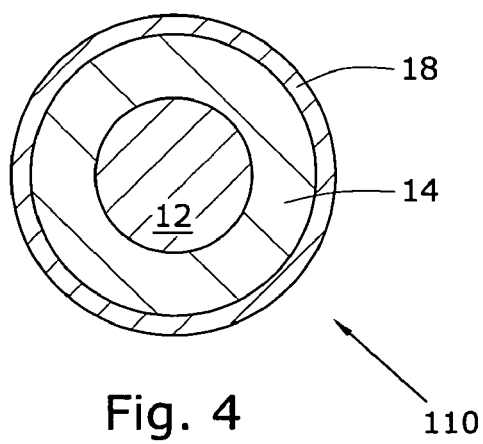
FIG. 4 is a schematic cross-sectional drawing of an alternate embodiment of an optical fiber according to the present invention.
Figure 5:
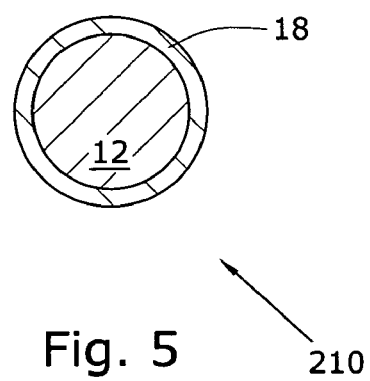
FIG. 5 is a schematic cross-sectional drawing of another alternate embodiment of an optical fiber according to the present invention.

As will be recognized by those in the art, not all of the layers of optical fiber 10 are necessary to achieve reduced hydrogen attenuation losses. For example, as shown in FIG. 4, an optical fiber 110 is shown with a substantially pure silica core 12, a cladding layer 14, and a hydrogen-retarding layer 18. All of these layers are as described above with respect to the embodiment shown in FIG. 1. A sheath layer such as layer 20 as described above may also be included. Additionally, as shown in FIG. 5, an optical fiber 210 includes only a pure silica core with a hydrogen retarding layer 18, where both substantially pure core 12 and hydrogen retarding layer 18 are similar to those as described above with respect to the embodiment shown in FIG. 1.

Optical fiber 10 is manufactured by any method known in the art, such as a system that draws fiber 10 from a silica glass preform. The preform may be made by any method known in the art, such as outside vapor-phase deposition, plasma-activated chemical-vapor deposition, vapor-phase axial deposition; however, the preferred method for making the preform follows the basic technique of modified chemical-vapor deposition (MCVD), one example of which is described for convenience.

In MCVD, silicon tetrachloride gas and dopant gases flow through a rotating glass tube made from fused silica. A burner at about 1600 degrees C. heats the tube, and the gases deposit the chemicals on the inner surface of the tube as soot. The burner also sinters the soot to form a layer of glass. The amount and type of gases flowing through the tube are changed to form the different parts of the preform. This process is repeated until all of the desired glass layers 12, 14 of fiber 10 have been formed. Finally, the soot is heated at about 2000 degrees C. to collapse the soot tube into a solid glass preform. In this example of MCVD, to form core 12 inside of cladding 14, the soot for cladding 14 is deposited first. In other examples, when other preform manufacturing techniques are used, such as outside vapor-phase deposition, the soot for substantially pure core 12 will be deposited first. Because these layers 12, 14 are formed on a glass tube, the glass tube becomes second silica layer 16 when the preform is pulled or drawn. As will be recognized by those in the art, if an alternate method of manufacturing is used where no glass tube is required, such as outside vapor-phase deposition or vapor-phase axial deposition, then second silica layer 16 may be eliminated from fiber 10 without altering the hydrogen-resistant properties thereof.

Once the preform is made, it is inserted into a furnace. The furnace heats the preform so that the fiber may be pulled. At this point, a grating pattern may optionally be written in line onto the fiber with a light source and a phase mask using any method known in the art, such as those methods disclosed in U.S. Pat. Nos. 5,367,588, 5,327,515, and 5,351,321, the disclosures of which are incorporated herein by reference. Alternatively, the grating pattern can be written by a holographic approach, as disclosed in U.S. Pat. No. 5,400,422, the disclosure of which is incorporated herein by reference.

As the drawn fiber either exits the furnace or the grating-writing area, the fiber passes through a deposition chamber or similar structure. Gas for depositing the hydrogen retarding layer flows through the deposition chamber. For example, if carbon is selected as the hydrogen-resistant material, then a gas mixture including a gas such as carbon tetrachloride flows through the deposition chamber. Carbon adheres to the surface of the drawn fiber and, due to the residual heat of the drawn fiber, reacts into a coating layer. Alternatively, the hydrogen resistant material may be formed on the preform, in which case it will be surrounded by second silica layer 16. Fiber 10 is then coated with the secondary coating material and preferably wound around a drum. As will be apparent to those in the art, this is only one of many possible ways in which fiber 10 may be manufactured.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

The invention claimed is:

1. An optical fiber comprising:
   a substantially pure silica core;
   a first intermediate layer comprising a doped silica at least partially surrounding the core;
   a second silica layer at least partially surrounding the first intermediate layer, wherein the second silica layer is not doped; and
   a hydrogen resistant layer at least partially surrounding the second silica layer.

2. The optical fiber of claim 1, wherein the hydrogen-resistant layer is substantially free of silica.

3. The optical fiber of claim 1, wherein the hydrogen-resistant layer comprises carbon.

4. The optical fiber of claim 1, wherein the first intermediate layer is doped with a material comprising fluorine or boron.

5. The optical fiber of claim 1, wherein the first intermediate layer is doped with a material comprising germanium or phosphorous.

6. The optical fiber of claim 1, further comprising a secondary coating substantially covering the optical fiber.

7. The optical fiber of claim 1, wherein the hydrogen-resistant layer comprises metal.

8. The optical fiber of claim 7, wherein the metal is selected from the group consisting of copper, copper alloys, aluminum, aluminum alloys, gold and gold alloys.

9. The optical fiber of claim 1, wherein the hydrogen-resistant layer comprises a ceramic material.

10. The optical fiber of claim 9, wherein the ceramic material comprises silicon nitride or silicon carbide.

11. The optical fiber of claim 1 comprising means for reducing hydrogen-induced attenuation at both relatively low and relatively high temperatures.

12. The optical fiber of claim 11, wherein the relatively low temperatures are less than about 170 degrees C.

13. The optical fiber of claim 11, wherein the relatively high temperatures are greater than about 170 degrees C.

* * * * *